C. E. MILLER.
EYEGLASSES.
APPLICATION FILED MAR. 8, 1913.
1,124,781.
Patented Jan. 12, 1915.
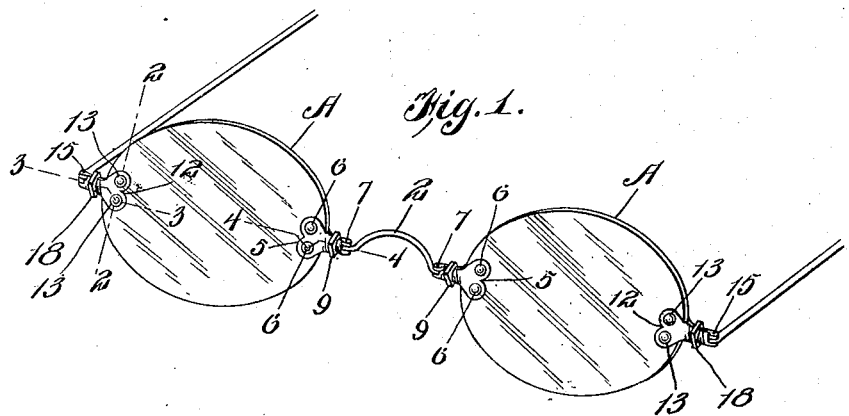
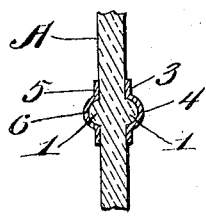
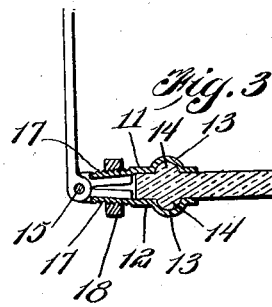
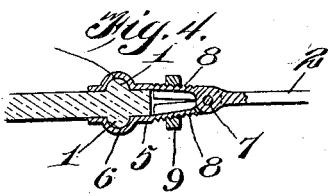
Witnesses
Louis R. Heinrichs
James A. Koehl
Inventor
Claude E. Miller
By Victor J. Evans
Attorney

UNITED STATES PATENT OFFICE.

CLAUDE E. MILLER, OF BIGSPRING, NEBRASKA.

EYEGLASSES.

1,124,781. Specification of Letters Patent. Patented Jan. 12, 1915.

Application filed March 8, 1913. Serial No. 752,978.

*To all whom it may concern:*

Be it known that I, CLAUDE E. MILLER, a citizen of the United States, residing at Bigspring, in the county of Deuel and State of Nebraska, have invented new and useful Improvements in Eyeglasses, of which the following is a specification.

This invention relates to eye glasses, spectacles or the like and particularly to lens fastenings therefor; and it has for its primary object the provision of means whereby the lenses may be connected with the nose bridge and temple bars without the provision of fastening screws.

Another object of the invention is the provision of means whereby the lenses will be held against vibratory movement on their support.

A further object of the invention is the provision of means for facilitating the operation of removing the lenses as the occasion may demand.

With these and other objects in view, the invention consists of certain novel features of construction, combination and arrangement of parts, as will be hereinafter described and claimed.

In the accompanying drawings: Figure 1 is a perspective view of a pair of eye glasses, showing the application of the invention thereto; Fig. 2 is a section, taken on line 2—2 of Fig. 1. Fig. 3 is a section on line 3—3 of Fig. 1; and Fig. 4 is a section on line 4—4 of Fig. 1.

Each lens A is provided on each side with substantially semi-spherical enlargements 1. The nose bridge 2 is provided with post-forming extensions 3 having hemi-spherical sockets, 4, which accommodate the projecting portions 1 at one side of the lenses. The post portions 3 form coöperating elements of clamping devices 5 having sockets 6 which are adapted to be disposed in position to receive the other projections 1 at the opposite sides of the lenses and in alinement with the sockets 4. The clamping devices 5 may be hinged at 7 to the portions 3, and as illustrated the latter and the portions 5 are provided with substantially conical exteriorly-threaded surfaces 8, on which are mounted correspondingly threaded adjusting nuts 9.

The nuts, when adjusted in the direction of the lenses A are designed to move the portions 3 and 5 relatively and thereby effect an operative clamping contact thereof with the lenses and an operative seating of the projections 1 in the sockets hereinbefore described. Through the fact that the projections 1 are spaced relatively, it is evident that their engagements in the correspondingly formed sockets will hold the lenses against vibratory movement.

The temple bars are provided with companion clamping elements 11 and 12 having sockets 13 similar to the previously described sockets and arranged to receive similar projections 14 adjacent to the outer ends of the lenses. The elements 11 and 12 are hingedly connected together at 15, the pins 16 of the hinge being extended through the forward ends of the temple bars, so as to permit the latter to be adjusted laterally with relation to the head. The elements 11 and 12 are otherwise identical in construction with the coöperating clamping elements on the nose bridge, being provided with substantially conical exteriorly threaded portions 17 and adjusting nuts 18.

From this construction it is seen that provision is made whereby any one or both of the lenses may be removed with facility; that the lenses are positively held against vibratory movement; that the lenses are not rendered weak at their points of attachment with the nose-bridge and temple bars, respectively; and that the device as a whole embodies simplicity with cheapness of construction and durability.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as claimed.

Having thus described my invention, what I claim is:—

A lens grip or clamp comprising a pair of conical arcuate shaped members pivotally connected at their outer ends, the opposite ends being formed with semispherical depressions disposed in confronting relation and adapted to receive projections formed on the lens, said members being exteriorly threaded and terminating in flanges to provide broad bearing surfaces, and a nut adjustably mounted on said members and adapted to retain the latter in clamping relation.

In testimony whereof I affix my signature in presence of two witnesses.

CLAUDE E. MILLER.

Witnesses:
E. I. JOHNSON,
GEORGE E. JUNGE.

Copies of this patent may be obtained for five cents each, by addressing the "Commissioner of Patents, Washington, D. C."